United States Patent [19]

Hodgeman et al.

[11] 4,234,157
[45] Nov. 18, 1980

[54] LIFT-TURN VALVE AND ACTUATOR ASSEMBLY

[75] Inventors: Herbert H. Hodgeman; Syed S. Ali, both of Houston, Tex.

[73] Assignee: Daniel Valve Company, Houston, Tex.

[21] Appl. No.: 926,283

[22] Filed: Jul. 20, 1978

[51] Int. Cl.³ .................... F16K 31/528; F16K 31/00
[52] U.S. Cl. ...................... 251/56; 251/215; 251/229
[58] Field of Search ................ 251/215, 56, 58, 229, 251/252, 264, 309, 312; 74/57

[56] References Cited

U.S. PATENT DOCUMENTS

| | | | |
|---|---|---|---|
| 1,890,524 | 12/1932 | Martin, Jr. | 251/264 |
| 2,953,344 | 9/1960 | Yancey | 251/58 |
| 3,046,802 | 7/1962 | Cupedo | 251/252 |
| 3,078,065 | 2/1963 | Vickery | 251/58 |
| 3,298,659 | 1/1967 | Cupedo | 251/58 |
| 3,542,331 | 11/1970 | Canalizo | 251/58 |
| 3,770,247 | 11/1973 | Nelson | 251/214 |
| 3,793,893 | 2/1974 | Heinen | 251/229 |
| 4,120,479 | 10/1978 | Thompson et al. | 251/56 |
| 4,120,479 | 10/1978 | Thompson et al. | 251/58 |

FOREIGN PATENT DOCUMENTS

26544  11/1910  France ...................... 251/252

Primary Examiner—Martin P. Schwadron
Assistant Examiner—A. Michael Chambers
Attorney, Agent, or Firm—James L. Jackson

[57] ABSTRACT

A lift-turn valve and actuator mechanism incorporating a valve plug and slip assembly that is movable with both axial and rotatable components of movement during opening and closing. Rotational movement is accomplished during lifting by cooperative relationship between opposed cam grooves defined in valve stem means and a pair of opposed rotatable cam follower elements that are supported by an actuator housing. The actuator housing is a fabricated structure incorporating threaded structure for receiving replaceable cam follower bearing mechanisms. The cam follower elements cooperate with the opposed cam grooves to provide efficient balanced force transfer through the valve actuator mechanism.

28 Claims, 6 Drawing Figures

Fig_1

LIFT-TURN VALVE AND ACTUATOR ASSEMBLY

FIELD OF THE INVENTION

This invention relates generally to valves for controlling the flow of fluid in conduit systems and more specifically relates to lift-turn type rotary plug valves incorporating cam energized slip assemblies for mechanically enhanced sealing. More particularly, the invention is directed to a valve actuator mechanism that is adapted to control lifting and rotation of a plug and slip assembly of the valve mechanism and to insure transmission of balanced operating forces from the valve mechanism to the valve actuator.

BACKGROUND OF THE INVENTION

Of the various types of valves utilized for controlling the flow of fluid within conduit systems, rotary plug valves have been found to be quite popular. Rotary plug valves are typically of compact design and are not excessively tall in comparison with many other types of valves having substantially the same flow passage dimension. Where physical size and height is an important or mandatory design consideration, rotary plug valves are widely used. Rotary plug valves are typically of simple nature, utilizing few moving parts and are of nominal cost, and these features substantially enhance the competitive nature of plug valves.

Among the disadvantages of rotary plug valves, however, are the disadvantages of operational pressure range and sealing ability. Most rotary plug valves function properly only at relatively low pressure ranges, for example in the order of 0-150 psig. This operational pressure restriction, in many flow systems, requires that other, less desirable, but higher pressure valves be utilized. Where plug valves incorporate lubricant enhanced sealing, additional sealant must be introduced into the sealant chambers quite often to insure against leakage. This requirement is an expensive service consideration which is frequently detrimental to the employment of such valves. Also, the lubricant sealant must be compatible with the product controlled by the valve.

In many cases, elastomeric sealing material is incorporated in the plug valve mechanism for establishment of the seal between the rotatable plug and the sealing surfaces of the valve body. The elastomeric sealing material tends to wear at a rapid rate, especially in valves of larger size, and therefore presents a problem from the standpoint of servicing, especially if the valve is intended for frequent cycling during use.

To gain the advantages of reasonably high operational pressure and extended service life of sealing material, plug valves have been developed that incorporate mechanically enhanced sealing. In this case, a rotatable plug element having a flow port formed therein is formed to define external interlocking connections and cam surfaces that mate with interlocking connections and cam surfaces defined by a pair of slip elements. The slip elements incorporate sealing elements, typically of the molded elastomeric type, with sealing surfaces defined within the valve body as the slip elements are moved laterally by the interengaging tapered cam surfaces of the plug member and slips. A valve actuator imparts vertical movement to a valve stem and a cam follower of the actuator traverses a typically L-shaped groove to control linear and rotational movement of the valve stem and plug member. Seal life is materially enhanced due to lateral movement of the slips into direct sealing engagement with the seating surfaces of the valve body. High pressure service capability is promoted by cam induced mechanically enhanced sealing.

It has been found, however, that the valve actuator of plug valves having plug and slip assemblies is frequently subjected to unbalanced operational forces and therefore may require frequent servicing due to accellerated wear induced by such forces. Accellerated wear is typically manifested in the plug rotational system of the valve and actuator assembly requiring frequent replacement of valve stems and rotational control elements such as cams and cam follower pins. It is desirable to provide a valve and actuator assembly incorporating a lift-turn type plug and slip system whereby both lifting and turning movements are accomplished by an actuator mechanism, with force transfer from the valve to the actuator being accomplished in evenly distributed manner and thus insuring that valve and actuator components are not susceptible to excessive wear inducing forces.

It is considered desirable to augment the sealing ability of the valve stem packing with a metal-to-metal seal and to provide stop means that limits upward movement of the valve and slip assembly. It is also desirable to provide means for insuring that the force applied by the valve actuator is not transmitted through the stem rotation mechanism of the valve and actuator assembly.

Accordingly, it is a primary feature of the present invention to provide a novel lift-turn type plug valve having a plug and slip assembly in combination with a valve actuator system that is designed for balanced transfer of operational forces from the valve mechanism.

It is also a feature of the present invention to provide a novel lift-turn type plug valve incorporating a valve actuator mechanism having opposed bearing supported cam follower elements that cooperate with cam grooves defined in an actuator stem for efficient force transfer during rotational movement of the plug element.

Among the several features of this invention is contemplated a novel lift-turn type valve mechanism incorporating a cam guided valve actuator mechanism wherein line contact is established between cam follower roller elements and tapered cam surfaces defined by a cam groove, thus preventing overstressing and excessive wear of cam followers or cam surfaces and thus extending the service life of the valve mechanism.

It is also a feature of the present invention to provide a novel lift-turn valve and actuator system wherein bearing supported cam follower elements are supported by a housing structure and are simply and quickly removed and replaced in the event cam follower wear should occur.

Another feature of this invention concerns the use of novel bearing supported cam follower elements that are provided with a lubrication system to insure easy servicing and extended operational service.

It is another feature of this invention to provide a novel valve actuator system for a lift-turn plug valve mechanism wherein an actuator housing is provided that is easily and simply fabricated to insure low cost manufacture that enhances the competitive nature of the valve actuator system.

Another feature of the present invention contemplates the provision of a novel valve actuator system for lift-turn type plug valves wherein a fabricated actuator housing is provided having tubular end sections such as may be formed by common steel pipe with an intermediate portion of the actuator housing defined by a forging for optimum machining capability and for adequate support of roller bearing type cam follower elements.

It is also a feature of the invention to provide a novel lift-turn type valve mechanism wherein a metal-to-metal seal is established between the valve stem and bonnet in the open position of the valve to augment the sealing ability of the stem packing system.

Another feature of the invention concerns the provision of internal stop means that prevents valve actuator forces from being applied to the rotational mechanism of the actuator.

Other and further objects, advantages and features of the present invention will become apparent to one skilled in the art upon consideration hereof. The form of the invention which will now be described in detail illustrates the general principles of this invention, but it is to be understood that this detailed description is not to be taken as limiting the scope of the present invention.

SUMMARY OF THE INVENTION

A preferred embodiment of this invention may conveniently take the form of a rotatable lift-turn valve mechanism defined by a valve body defining a generally cylindrical valve chamber within which is removably received a plug and slip assembly. A pair of slip elements are connected to a ported tapered plug by an interlocking dove-tail connection that functions as a cam on downward movement of the plug to cause lateral movement of the slips into sealing engagement with seat surfaces defined within the valve chamber. Linear movement of the plug member is accomplished by means of a powered valve actuator while rotary movement of the plug member is accomplished by camming interaction between an actuator stem defining opposed pairs of cam grooves and a pair of cam follower elements that are rotationably supported by an actuator housing and received within the cam grooves.

The cam grooves each include linear portions allowing linear components of actuator stem movement with the linear portions being radially positioned 90° from one another. An intermediate or rotary portion of each cam movement at an inclination of substantially 45° about the periphery of the actuator stem. The cam grooves are defined in part by tapered side wall surfaces that mate and define line contact with frusto-conical cam follower surfaces of bearing supported rotary cam follower pins. The cam follower pins are supported within bearing housings that are removably connected to bearing support elements provided on the actuator housing, for ease of replacement. Each of the bearing housings is provided with a lubricant fitting whereby lubricant may be injected into the bearings for lubrication thereof.

To facilitate simple and inexpensive manufacture, the actuator housing is formed of upper and lower tubular sections such as ordinary steel pipe, which sections are interconnected by welding and provided with appropriate flanges for bolted connection of the actuator housing to other structural components. The bearing support elements are defined by internally threaded tubular elements that are welded within apertures formed in one of the tubular sections. In the alternative, a welded actuator housing may be defined by tubular end sections that are interconnected with an intermediate section defined by a forging having opposed bosses defined thereon. The bosses are internally machined to receive bearing housings supporting bearings and cam follower elements.

BRIEF DESCRIPTION OF THE DRAWINGS

So that the manner in which the above recited features, advantages and objects of the invention, as well as others which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

In the drawings.

DESCRIPTION OF THE PREFERRED EMBODIMENT

Figure 1:
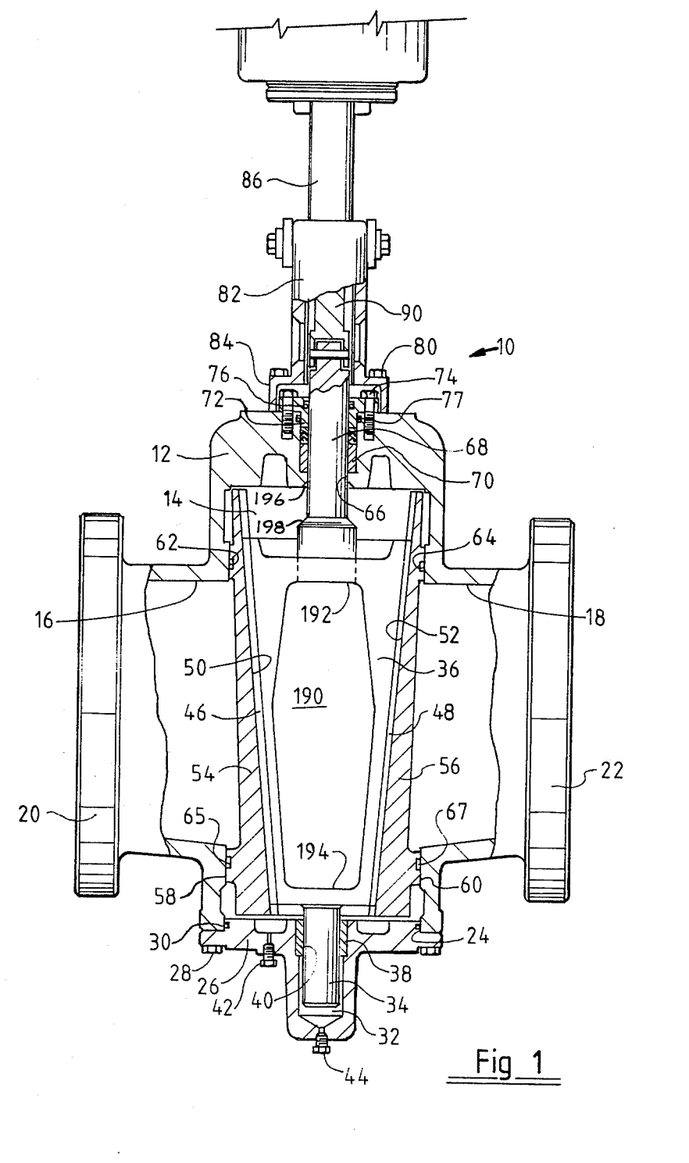
FIG. 1 is an elevational view of a valve and actuator assembly constructed in accordance with the present invention with portions thereof broken away and shown in section.

With reference now to the drawings and first to FIG. 1, a lift-turn type plug valve and actuator mechanism is illustrated generally at 10 which includes a valve body 12 defining a valve chamber 14. The valve body also defines inlet and outlet flow passages 16 and 18 disposed in intersecting relation with the valve chamber. Connection between the valve body and flow conduits controlled thereby may be accomplished by means of connection flanges 20 and 22 that are formed to define apertures through which bolts or studs may extend. Obviously, other types of conventional conduit connection structure may be employed by the valve body as desired.

At the lower portion of the valve body an opening 24 is defined through which a plug and slip assembly may be inserted into the valve chamber 14 as discussed hereinbelow. The body opening 24 is closed by means of a bonnet structure 26 that is secured to the valve body 12 by a plurality of bolts 28. An annular sealing element 30, such as an O-ring, or the like, establishes a fluid tight seal between the valve body structure and the bonnet. The bonnet structure is also formed to define an internal receptacle 32 within which may be received the lower stem 34 of a plug element 36. A bearing element 38 is retained within the bonnet structure 26 and defines an internal bearing opening 40 through which the lower stem or trunnion 34 extends. The bonnet is provided with a drain element 42 for the purpose of draining the valve chamber as desired and lower portion of the bonnet structure includes a drain fitting 44 for the purpose of draining the receptacle 32.

Opposed portions of the plug element 36 are formed to define interlocking grooves or projections 46 and 48 that mate with interlocking grooves or projections 50 and 52 defined on a pair of slip members 54 and 56, respectively, to retain the slip members in movable interconnected relationship with the plug member 36. Interlocking elements 46 and 48 are each disposed in angulated relation with the rotational axis of the plug member and establish a cam-like relationship with the connection structure 50 and 52 of the slips. As the plug member 36 moves linearly in relation to the slip members 54 and 56, the slip members will move laterally, causing the plug and slip assembly to expand or contract radially due to this camming relationship. The valve body prevents the slip members from moving linearly along with the plug member. In the arrangement illustrated in FIG. 1, the slip members 54 and 56 will be moved radially outwardly as the plug member 36 is moved downwardly. This radially outward movement of the slips will cause sealing surfaces 58 and 60 of the slips 54 and 56 to engage seat surfaces 62 and 64 that are defined by the valve body structure within the valve chamber. The wedging or camming action that takes place by virtue of interaction between the interlocking grooves or projections of the plug and slips will cause the sealing surfaces of the slips to be urged in mechanically tight sealing engagement with the seat surfaces 62 and 64. This wedging or tightening action develops a mechanically induced seal that will withstand the effects of high pressure service. Soft sealing members 65 and 67 may be retained within appropriate seal grooves formed in the slip members so as to enhance the sealing ability of the valve mechanism. Sealing members 65 and 67 may be composed of any suitable elastomeric or plastic sealing material, depending upon the particular surface for which the valve mechanism is intended.

The upper portion of the valve body structure is formed to define a stem passage 66 through which a valve stem 68 extends. The stem passage is enlarged above the restricted lower portion thereof so as to define an annular packing chamber within which is received a packing assembly 70. A packing retainer or gland 72 may be secured to the upper extremity of the valve body by means of bolts 74 for the purpose of retaining the packing assembly 70 in place within the packing chamber. The packing retainer may also be formed to define internal and external grooves within which may be provided sealing elements 76 and 77, respectively, such as O-rings or the like for the purpose of establishing a positive seal outwardly of the packing chamber. The sealing element 76 also prevents dust, dirt and other debris from entering the packing chamber along the valve stem 68.

Figure 2:
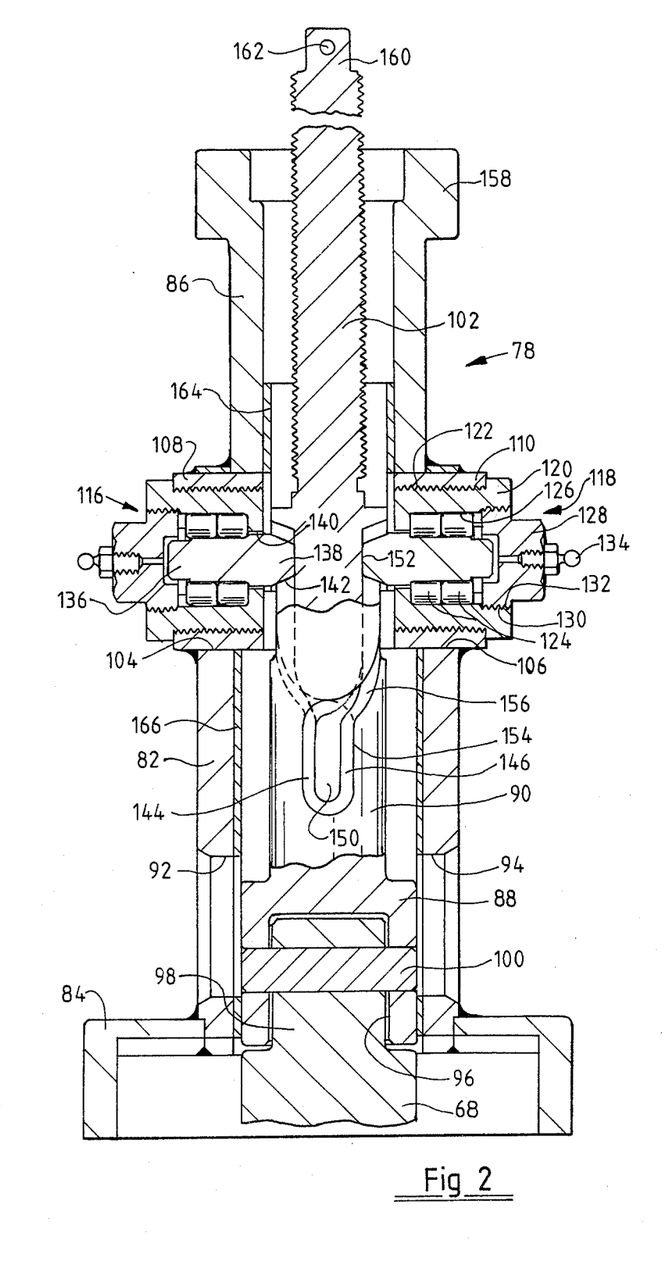
FIG. 2 is a sectional view of the valve actuator of FIG. 1 illustrating the structural components thereof in detail.

As illustrated at the upper portion of FIG. 1, and in more detail in FIG. 2, an actuator housing generally shown at 78 may be secured to the upper portion of the valve body 12 by means of bolts 80. The actuator housing 78 generally includes an intermediate portion 82, an enlarged lower portion 84 and a smaller upper portion 86. The enlarged lower portion 84 is of sufficient internal dimension to receive the upper portion of the packing retainer 72 and is formed to define bolt openings through which bolts 80 extend for connection of the actuator housing to the valve body structure. It should be borne in mind that the upper portion of the packing retainer 72 is of non-circular configuration allowing bolts 80 to extend past this non-circular portion and enter appropriate threaded apertures formed in the valve body structure.

The intermediate section 82 of the actuator housing 78 may be of generally cylindrical configuration of sufficient internal dimension to receive the lower enlarged connection portion 88 of an actuator stem 90. The tubular intermediate section 82 is also formed to define access openings 92 and 94 through which access may be gained to the connection portion 88 of the actuator stem so as to facilitate establishment of a mechanical connection between the valve stem 68 and the actuator stem 90. As shown in detail in FIG. 2, the enlarged connector portion 88 of the actuator stem 90 is formed to define a receptacle 96 within which may be received an upper connection portion 98 of the valve stem 68. A transverse connector pin 100 extends through appropriate transverse passages and apertures formed in the valve stem and actuator stem to provide a non-rotatable connection therebetween.

The upper portion 86 of the actuator housing 78 is also of generally cylindrical configuration and is of sufficient length to receive the upper threaded extremity 102 of the actuator stem 90. The cylindrical housing section 82 is formed to define opposed generally circular openings 104 and 106 within which are located internally threaded bearing lower portion 84 is of sufficient internal dimension to receive the upper portion of the packing retainer 72 and is formed to define bolt openings through which bolts 80 extend for connection of the actuator housing to the valve body structure. It should be borne in mind that the upper portion of the packing retainer 72 is of non-circular configuration allowing bolts 80 to extend past this non-circular portion and enter appropriate threaded apertures formed in the valve body structure.

The intermediate section 82 of the actuator housing 78 may be of generally cylindrical configuration of sufficient internal dimension to receive the lower enlarged connection portion 88 of an actuator stem 90. The tubular intermediate section 82 is also formed to define access openings 92 and 94 through which access may be gained to the connection portion 88 of the actuator stem so as to facilitate establishment of a mechanical connection between the valve stem 68 and the actuator stem 90. As shown in detail in FIG. 2, the enlarged connector portion 88 of the actuator stem 90 is formed to define a receptacle 96 within which may be received an upper connection portion 98 of the valve stem 68. A transverse connector pin 100 extends through appropriate transverse passages and apertures formed in the valve stem and actuator stem to provide a non-rotatable connection therebetween.

The upper portion 86 of the actuator housing 78 is also of generally cylindrical configuration and is of sufficient length to receive the upper threaded extremity 102 of the actuator stem 90. The cylindrical housing section 82 is formed to define opposed generally circular openings 104 and 106 within which are located internally threaded bearing support elements 108 and 110. Although the housing structure 78 as shown in FIG. 2 is designed particularly for welded construction to peovide a low-cost housing structure, such construction is not considered limiting of the present invention. It is intended that the housing structure 78 be formed in any suitable manner, such as by casting or by machining from forged stock, for example.

A pair of bearing assemblies illustrated generally at 116 and 118 in FIG. 2 are retained by the bearing support elements 108 and 110. As shown at the right side portion of FIG. 2, each of the bearing assemblies includes a generally cylindrical housing structure 120 having an externally threaded portion 122 that is received by internal threads formed in the bearing support elements 108 and 110. Bearing elements 124 are received within a generally cylindrical receptacle 126 def therein by means of a retainer cap 128 having an externally threaded portion 130 that is received by internal threads 132 defined at the outer portion of the bearing receptacle 126. A lubricant fitting 134 is threadedly received by the cover or cap 128 and provides means for supplying the bearings 124 with lubrication to enhance the service life thereof.

Figure 3:
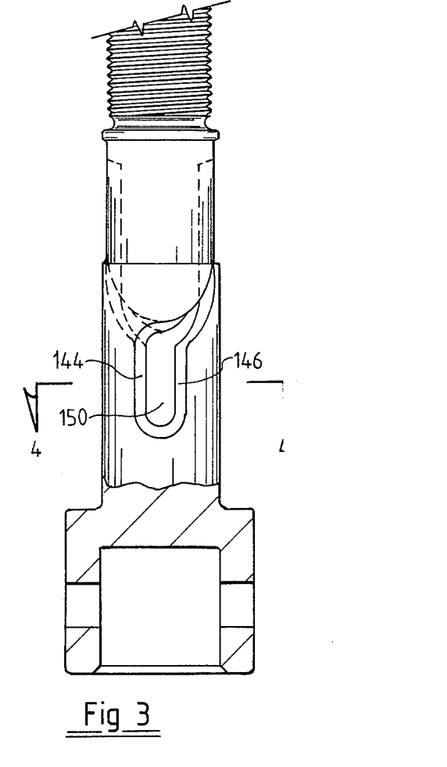
FIG. 3 is an elevational view of the actuator stem of the actuator of FIG. 2, shown separated from the actuator system and illustrating the cam grooves thereof partly in full line and partly in broken line.
Figure 4:
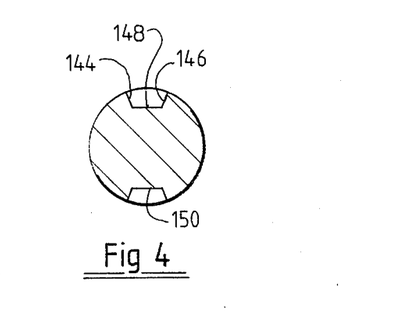
FIG. 4 is a transverse sectional view taken along line 4—4 of FIG. 3 and showing the particular configuration of the cam grooves.

As illustrated at the left side of FIG. 2, the bearings 124 of bearing elements 116 and 118 provide rotary support for an elongated stem or pin element 136 having a cam follower portion 138 defined at one extremity thereof and extending through an aperture 140 formed in the bearing housing 120. The cam follower portion 138 is formed to define a frusto-conical cam follower or cam engaging surface 142 that is capable of mating engagement with tapered side wall surfaces 144 and 146 of opposed cam grooves 148 and 150 that are formed in the actuator stem 90 as shown in FIGS. 2, 3 and 4. In the sectional view of FIG. 4, the tapered side walls 144 and 146 of the grooves 148 and 150 are clearly evident.

Figures 5, 6, 7, 8:
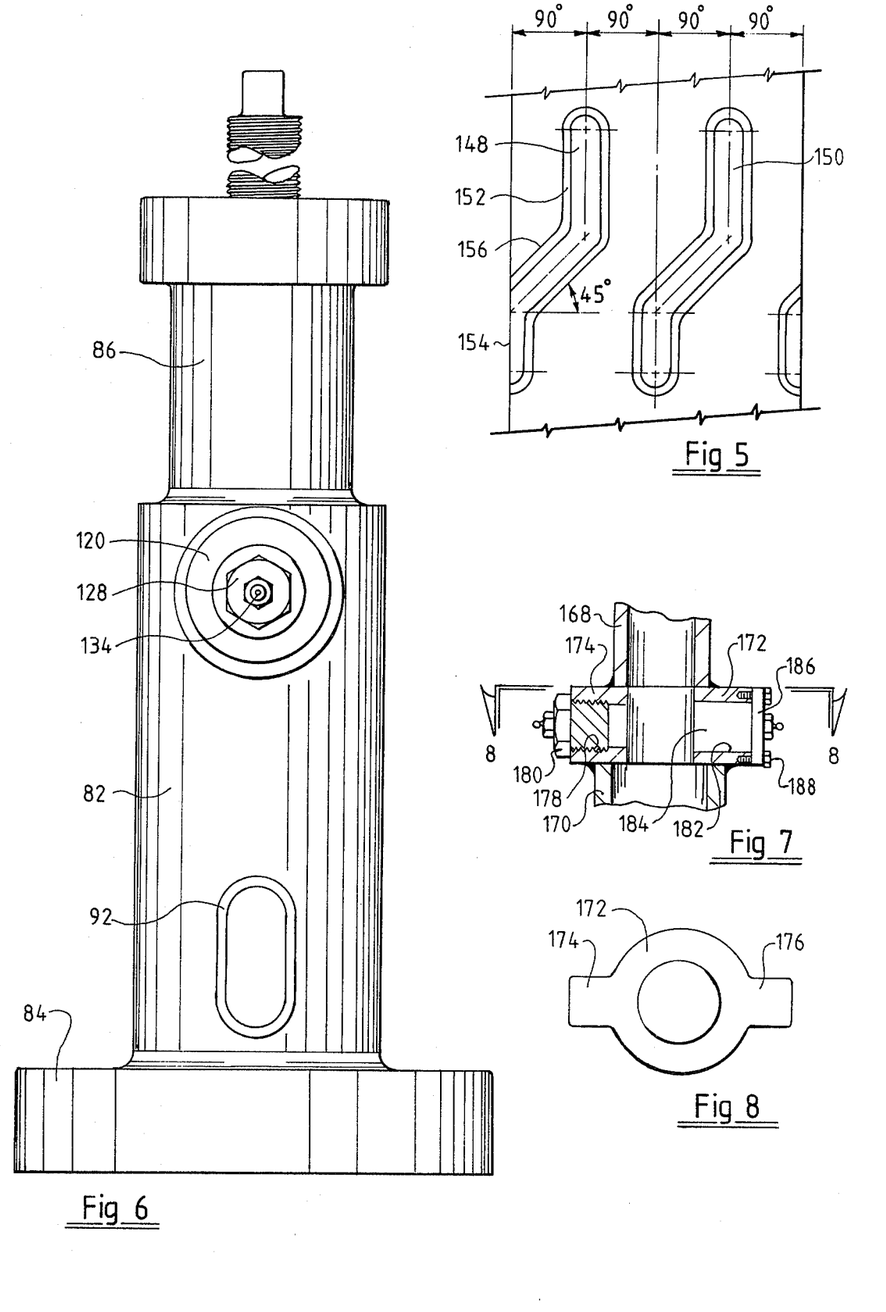
FIG. 5 is a schematic illustration of the opposed cam grooves of the actuator stem of FIG. 3.
FIG. 6 is an elevational view of the actuator housing of FIGS. 1 and 2 shown disassembled from the plug valve.
FIG. 7 is a partial sectional view of an actuator housing representing an alternative embodiment of this invention.
FIG. 8 is a plan view taken along line 8—8 of FIG. 7 and illustrating the forging representing the intermediate section of the actuator housing.

Referring now to FIGS. 2 and 3, and particularly to the diagrammatic illustration of FIG. 5, the elongated camming grooves 148 and 150 are formed to define generally vertical upper and lower portions 152 and 154 that are separated by an intermediate rotary portion 156. The upper and lower portions 152 and 154 allow linear travel of the actuator stem 90 and the valve stem 68 connected thereto because the upper and lower portions of the grooves are aligned with the axis of the actuator stem. The intermediate section 156 of the cam grooves, through interaction of the cam follower portions 138 of the stem elements 136 with appropriate side walls of the intermediate cam section, causes 90° rotation of the actuator stem and valve stem as the intermediate section of each of the cam grooves is traversed by the cam followers. The cam followers and cam grooves cooperate during upward movement of the actuator stem to rotate the actuator stem in one rotary direction and rotate the actuator stem in the opposite direction during downward actuator stem movement.

The upper portion 158 of the upper housing section 86 is formed to define a flange 158 to which may be connected a suitable valve actuator, shown partially in FIG. 1. The valve actuator may include means for engaging the upper threaded portion 102 of the actuator stem and imparting linear movement to the actuator stem. For example, the valve actuator may include a rotary internally threaded drive nut that receives the threads at the upper portion of the actuator stem. As the drive nut is rotated, the actuator stem is moved linearly.

The valve actuator may be of the non-rotary type and may simply cause linear movement to the actuator stem. The upper portion of the actuator stem may be provided with a connector portion 160 having an aperture 162 formed therein. A connector pin may extend through the aperture 162 and may connect the upper extremity of the actuator stem to an actuator shaft such as the actuator shaft of a linear hydraulic motor or cylinder actuator, such as might be capable of moving the actuator stem 90 linearly within the actuator housing 78.

As the actuator stem 90 is moved linearly by the valve actuator, the tapered cam follower portions of the rotary stems or pins 136 will maintain proper orientation of the actuator stem 90 as the upper and lower linear portions of the cam grooves are moved relative to the cam followers. The plug element will move linearly but the linear portions of the cam grooves will prevent rotational movement until the slip elements are retracted and unseated. As the rotary portions 156 of the grooves are is moved past the cam followers, the tapered cam surfaces 142 defined by the frusto-conical extremities of the pins engage respective curved and tapered side wall cam surfaces of the cam grooves and cause rotational camming movement of the actuator stem. The intermediate portions of the cam grooves are designed to achieve 90° rotation of the actuator stem. By providing mating tapered relationships between the cam followers and the cam grooves, line contact is established between the side wall surfaces of the grooves and the tapered surfaces of the cam followers. This line contact provides superior force transmitting ability without causing unnecessary wear of either the cam grooves or the cam follower elements. This particular manner of accommodating force transmission effectively facilitates use of the actuator mechanism in conjunction with valves having large valve elements that must be rotated within a relatively short period of time. Where the valve element to be rotated is quite massive and heavy, the cam grooves and cam follower elements will be subjected to mechanical loads of substantial magnitude due to the inertia of starting and stopping plug rotation. By providing opposing grooves and opposing cam followers, mechanical loads that are transmitted from the actuator stem to the cam follower elements will be transmitted in balanced manner equally to each of the cam follower elements. By dividing the mechanical forces so transmitted and by distributing these forces through opposed cam and cam follower elements, inertia induced forces will be effectively accommodated and wear of the cam grooves and the rotary cam follower elements will be minimized.

The actuator housing structure 78 is so designed as to be fabricated of simple tubular stock that is welded in the manner shown in FIGS. 2 and 6. The tubular stock may be formed of steel or any other suitable, relatively inexpensive material having sufficient structural integrity for the purpose intended. The interior of the actuator housing may be provided with a lining to minimize wear. As shown in FIG. 2, upper and lower tubular linings 164 and 166 are positioned within respective upper and lower housing sections. The lining material may be a soft metal, such as brass, or, in the alternative, may take the form of any one of a number of suitable wear-resistant plastic lining materials, such as polytetrafluoroethylene.

In the event the cam grooves 148 and 150 of the actuator stem 90 should become worn, or in the event the cam follower portions 138 of the bearing assemblies should become worn, replacement of these parts is of simple nature and can be accomplished by means of field repair. For replacement of the actuator stem 90, the bearing housings 120 are simply unthreaded to withdraw the cam follower portions of the elongated pins 136 from respective ones of the cam grooves 148 and 150. After this has been accomplished, the connection pin 100 may be removed from the valve stem and actuator stem connection by moving the pin 100 laterally through one of the access openings 92 or 94. The actuator stem then may be easily extracted and replaced. This manner of service may be accomplished in a few minutes time involving minimal loss of production. Replacement of the cam follower elements can also be accomplished by manner of field repair. The bearing housings 120 are simply unthreaded from the bearing support sleeves 108 and 110 with replacement bearing assemblies simply being threaded into the bearing support sleeves to the full extent thereof.

An alternate embodiment of the present invention is illustrated in FIGS. 7 and 8 wherein an actuator housing may be formed by upper and lower tubular housing sections 168 and 170 that are welded or otherwise connected to a forged intermediate section 172. As shown in FIG. 8, the intermediate section may take the form of a simple circular forging having bosses 175 and 176 formed thereon that may be machined so as to receive appropriate bearing assemblies. As shown at the left hand portion of FIG. 7, boss 174 may be formed to define an internally threaded passage 178 that is adapted to receive the externally threaded portion of a bearing assembly 180 that may be constructed essentially identical as compared to the bearing assembly 118 of FIG. 2.

At the right hand portion of FIG. 7, boss 172 is shown to be formed to define an internal bore 182 through which may be extended a generally cylindrical portion 184 of a flanged bearing assembly 186. Bolts 188 may secure the bearing assembly to the boss 172. By employing a forging structure, such as shown at 172 in FIG. 8, simple and efficient manufacture is provided that insures precise axial alignment between opposing rotary pins and cam follower elements and thus insures optimum balanced transmission of forces from the actuator stem to the cam follower element. Moreover, the upper and lower tubular housing sections 168 and 170 may be welded to the intermediate forged section 172 prior to machining the bearing retainer passages in the bosses 174 and 176. In this manner, accurate orientation of the bearings may be obtained with respect to the upper and lower housing sections, thereby further promoting balanced force transmission from the actuator stem to the rotary cam follower element.

It is desirable to provide a lift-turn type valve mechanism that is capable of accommodating efficient flow of fluid without creating excessive turbulence that might otherwise retard or interfere with efficient flow. It is also desirable to provide a valve mechanism wherein a port is formed in the valve element that will be properly oriented with respect to the inlet and outlet flow passages of the valve body in a raised position of the lift-turn plug element. As shown in FIG. 1, the plug element 36 is formed to define an elongated port 190 which, in the seated position illustrated in FIG. 1, has the upper extremity 192 of the port in substantial alignment with the upper portions of the inlet and outlet flow passages 16 and 18. In this position the lower extremity 194 of the port will be positioned well below the lower portions of the inlet and outlet flow passages. The cross-sectional area of the port 190 is formed so as to exceed the cross-sectional area defined by the flow passages 16 and 18. For example, the cross-sectional area of the port 190 may be in the order of 110% of the cross-sectional area of the inlet or outlet flow passages.

As the plug element is lifted by the actuator stem 90 in the manner discussed above in connection with FIG. 2, the plug element will be rotated 90°, positions the slip members 54 and 56 in a lateral, non-interfering relation with the flow of fluid through flow passages 16 and 18 and the port 190. Upward movement of the plug that occurs during lifting and turning will cause the lower extremity of the port 190 to become positioned in substantial registry with the lower portion of the inlet and outlet openings 16 and 18. By virtue of the fact that the port 190 exceeds the cross-sectional dimension of the inlet and outlet flow passages, the port 190 will not create any back pressure or turbulence that might otherwise interfere with flow through the valve mechanism. Because the size of the port 190 exceeds the cross-sectional dimension of the inlet and outlet flow passages, the port may be slightly misaligned with respect to the flow passages without creating any adverse flow condition. As the sliding, camming connection between the plug and slips becomes worn over a long period of service, the maximum downward position of the plug element will vary slightly. This slight change of plug position will not ordinarily require servicing or adjustment because the port 190 is of sufficient dimension to maintain proper registry with the inlet and outlet flow passages so as to prevent the development of turbulence or flow restriction.

Referring again to FIG. 1, it is desirable to provide means for augmenting the sealing ability of the valve stem packing assembly 70. This feature is conveniently accomplished by forming a frusto-conical internal back-face sealing surface 196 within the upper portion of the body structure 12, which is adapted for metal-to-metal sealing engagement with an external frusto-conical back-face sealing surface 198 that is formed on the valve stem 68. As the valve element 36 is lifted to the open position, the sealing surface 198 of the valve stem establishes sealing engagement with the internal sealing surface 196. Should the stem packing assembly 70 become worn to the point that leakage might occur, the metal-to-metal seal established by back-face sealing surfaces 196 and 198 will prevent such leakage. Repair of the packing assembly can then be scheduled for a time that is convenient, such as when the flow line is not in production.

The surfaces 196 and 198 also function to provide stop means to limit upward travel of the valve stem and valve element. More importantly, with the valve in the open position, forces applied by the valve actuator to actuator stem 90 and valve stem 68 will not be applied through the stem rotational mechanism shown in FIG. 2. The cam follower portions 138 of bearings 124 will remain substantially free of valve actuator forces in the open and closed positions of the valve mechanism. Service life of the stem rotational mechanism will be materially enhanced by the stem stop feature which limits mechanical stress of the cam follower bearings and cam grooves.

In view of the foregoing, it is evident that the present invention provides a novel lift-turn rotary plug valve mechanism that incorporates a force balancing mechanism for achieving rotation of plug and slip structure of a valve mechanism within the valve body. The invention also provides a novel lift-turn type plug valve mechanism that includes a valve actuator assembly that effectively retards wear by effectively accommodating transfer of forces as the plug and slip assembly is rotated within the valve body. The commercial nature of the invention is also rendered effective by providing a valve actuator housing structure that may be simply and efficiently welded to provide for low cost manufacture. Further, the present invention provides a novel lift-turn type plug valve mechanism that incorporates a ported plug structure that is efficiently designed to accommodate various positioning of the plug within the valve body without causing the development of turbulence that might otherwise restrict the flow of fluid through the valve mechanism. It is therefore clearly apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

Having thus fully described this invention,
What is claimed is:

1. A valve mechanism for controlling the flow of fluid, said valve mechanism comprising:
    a valve body structure defining a valve chamber and inlet and outlet flow passages intersecting said valve chamber;
    a valve element being located within said valve chamber and being movable with both axial and rotatable components of movement for controlling flow of fluid through said flow passages; said valve element including an elongated generally cylindrical valve stem connected in nonrotatable relation to said valve element and extending in sealed relation through said valve body;
    an elongated actuator stem having a circular cross section being interconnected in nonrotatable relation with said valve stem, the outer surface of said actuator stem being formed to define a pair of opposed cam grooves each of said cam grooves defining a pair of linear end portions connected by an intermediate rotary portion of helical form, said linear portions of each cam groove being offset 90° relative to the circumference of the actuator stem from one another and being disposed in parallel relation with the axis of said actuator stem, said actuator stem defining cam surfaces along at least a portion of the sides of said cam grooves;
    actuator housing means being connected to said valve body and defining an elongated passage through which said elongated actuator stem means extends;
    a pair of opposed cam follower elements being rotatably supported by said actuator housing means and being positioned on opposite sides of said actuator stem, said cam follower means having cam engaging portions thereof extending within respective ones of said cam grooves, said cam follower elements reacting with said cam surfaces of at least the intermediate rotary portions of said opposed cam groove means to induce 90° rotary movement of said actuator stem, valve stem and valve element when said actuator stem is reciprocated; and
    means for imparting linear reciprocal movement to said actuator stem means and allowing rotary movement of said actuator stem means responsive to interaction between said cam follower elements and said helical rotary portions of said cam grooves.

2. A valve mechanism as recited in claim 1, wherein:
    each of said cam grooves is defined by tapered side walls forming said cam surfaces;
    said cam engaging portions of said cam follower elements are of frusto-conical configuration and establish said rolling engagement with said tapered side walls.

3. A valve mechanism as recited in claim 1, wherein:
    opposed bearing elements are connected in fixed, opposed relation by said actuator housing means; and
    said cam engaging elements are rotatably supported by respective ones of said opposed bearing elements.

4. A valve mechanism as recited in claim 1, wherein:
    opposed bearing support means is defined by said actuator housing means;
    bearing assembly means is supported by each of said bearing support means, each of said bearing assembly means includes a bearing housing adapted for support by said bearing support means and formed to define a bearing and cam follower receptacle;
    bearing means is positioned within said bearing and cam follower receptacle; and
    said cam follower elements are defined by elongated pin elements being rotatably supported in axially aligned and opposed relation by said bearing means, said cam engaging portions of said cam follower elements being formed at one extremity of each of said pin elements and extending into said actuator housing means and being receivable within said cam groove means for said rolling contact with said cam surfaces.

5. A valve mechanism as recited in claim 1, wherein:
    said actuator housing means defines access opening means;
    said actuator stem includes valve stem connector means at one extremity thereof;
    said valve assembly including said elongated valve stem having an extremity that is receivable in interconnected relation with said valve stem connector means of said actuator stem; and
    said connector means being accessible through said access opening means for establishing a non-rotatable connection between said valve stem and actuator stem means.

6. A valve mechanism as recited in claim 1, wherein said actuator housing means comprises:
    first and second tubular housing sections being connected together and defining an elongated tubular housing structure, said first tubular housing section defining a connection flange for connection of said first tubular housing to said valve body, said second tubular housing section defining a connection flange to which said means to impart linear movement is connectable; and said first tubular housing section defines bearing support means receiving and supporting said cam follower elements.

7. A valve mechanism as recited in claim 6, wherein:
said first and second tubular housing sections are connected by welding and said first tubular housing section is formed to define opposed bearing support apertures; and
said bearing support means is defined by opposed generally cylindrical support elements positioned within said support apertures and connected by welding to said first tubular housing section.

8. A valve mechanism as recited in claim 6, wherein said first tubular housing section defines at least one access opening;
said actuator stem includes valve stem connector means at one extremity thereof;
said valve stem is formed to define an extremity that is receivable in interconnected non-rotatable relation with said valve stem connector means of said actuator stem;
said interconnected extremities of said valve stem and actuator stem being accessible through said access opening means for establishing a non-rotatable connection between said valve stem and actuator stem.

9. A valve mechanism as recited in claim 1, wherein said actuator housing means comprises:
first and second tubular housing sections; and
an intermediate housing element being interposed between and connected to said first and second housing sections, said intermediate housing element having an actuator stem passage opening formed therein and defining opposed boss portions, said boss portions being internally formed to define bearing support means for receiving and supporting said cam follower elements.

10. A valve mechanism as recited in claim 9, wherein:
said intermediate housing element is connected to said first and second housing sections by welding.

11. A valve mechanism as recited in claim 9, wherein:
each of said opposed boss portions of said intermediate housing element is formed to define internally threaded bores; and
said bearing support means define externally threaded portions that are receivable within respective ones of said internally threaded bores.

12. A valve mechanism as recited in claim 9, wherein:
each of said opposed boss portions of said intermediate housing element is formed to define an internal bore, said internal bores being in axial registry; and
said bearing support means include external flange portions and are partially receivable within respective ones of said internal bores and said external flange portions are connectable to said bosses by bolting.

13. A valve mechanism as recited in claim 1, wherein:
internal tapered sealing surface means is defined within said valve body about said elongated passage; and
external tapered sealing surface means is defined by said actuator stem and is capable of establishing sealing engagement with said internal tapered sealing surface means.

14. a valve mechanism as recited in claim 13, wherein:
said internal and external tapered sealing surface means define stop means for limiting axial movement of said actuator stem in one direction.

15. A valve mechanism for controlling the flow of fluid, said valve mechanism comprising:
a valve body defining a valve chamber and inlet and outlet flow passages intersecting said valve chamber;
a valve element being located within said valve chamber and being movable with both axial and rotatable components of movement for controlling flow of fluid through said flow passages;
a valve stem extending in non-rotatable relation from said valve element and extending in sealed relation through said valve body;
an elongated actuator housing being connected to said valve body and defining a stem passage receiving said valve stem;
an elongated actuator stem having a circular cross section being located within said stem passage of said actuator housing and having one extremity thereof non-rotatably connectable to said valve stem, the outer surface of said actuator stem being formed to define a pair of opposed cam grooves each having linear portions offset substantially 90° from one another relative to the circumference of the stem and extending in substantially parallel relation with the axis of said actuator stem and an intermediate rotary portion of generally helical form and extending in angular relation to the axis of said actuator stem and interconnecting an end portion of said linear portions, said actuator stem defining side cam surface means along at least said intermediate rotary portion of said cam grooves;
opposed bearing support means being defined by said actuator housing;
bearing means being received by said bearing support means;
a pair of cam follower pin means being rotatably supported by said bearing means and defining cam engaging means extending into said stem passage and being received within respective ones of said cam grooves, said cam engaging means interacting with said linear end portions of said cam grooves to allow linear movement of said actuator stem and maintain predetermined orientation of said actuator stem and, upon linear movement of said helical rotary portion of said cam grooves past said cam follower pin means, said cam engaging means establishes rolling camming engagement with said side cam surface means and causes said actuator stem to be rotated substantially 90° and induces similar rotation of said valve stem and said valve element when said actuator stem is linearly reciprocated; and connection means being defined by said actuator housing for receiving a valve actuator that imparts linear movement to said actuator stem.

16. A valve mechanism as recited in claim 15, wherein:
said cam grooves are defined in part by tapered side wall surfaces; and
said cam engaging means of said cam follower pin means defines frusto-conical cam engaging surface means establishing line contact with said tapered side wall surfaces.

17. A valve mechanism as recited in claim 15, wherein:
said helical rotary portions of said cam grooves are oriented at substantially 45° in relation to said linear portions of said cam grooves.

18. A valve mechanism as recited in claim 15, wherein said actuator housing comprises:
   first and second tubular housing sections being connected together and defining an elongated tubular housing structure, said first tubular housing section defining a connection flange for connection of said first tubular housing to said valve body, said second tubular housing section defining a connection flange to which said valve actuator is connectable; and
   said first tubular housing section defines bearing support means receiving and supporting said cam follower elements.

19. A valve mechanism as recited in claim 18, wherein:
   said first and second tubular housing sections are connected by welding and said first housing section is formed to define opposed bearing support apertures; and
   said bearing support means is defined by opposed generally cylindrical support elements positioned within said support apertures and connected by welding to said first housing section.

20. A valve mechanism as recited in claim 20, wherein:
   said first tubular housing section defines at least one access opening;
   said actuator stem includes valve stem connector means at one extremity thereof; and
   said valve stem is connected in non-rotatable relation with said actuator stem by a connector pin extending through registering openings in said valve stem and actuator stem, said connector is accessible through said access opening for the purpose of connecting and disconnecting said valve stem and actuator stem.

21. A valve mechanism as recited in claim 15, wherein said actuator housing means comprises:
   first and second tubular housing sections;
   an intermediate housing element being interposed between and connected to said first and second housing element, said intermediate housing section having an actuator stem passage opening formed therein and defining opposed boss portions, said boss portions being internally formed to define bearing support means for receiving and supporting said cam follower elements.

22. A valve mechanism as recited in claim 21, wherein:
   said intermediate housing element is connected to said first and second housing sections by welding.

23. A valve mechanism as recited in claim 21, wherein:
   each of said opposed boss portions of said intermediate housing element is formed to define an internally threaded bore; and
   said bearing support means define externally threaded portions that are receivable within said internally threaded bores.

24. A valve mechanism as recited in claim 21, wherein:
   each of said opposed boss portions of said intermediate housing element is formed to define an internal bore, said internal bores being in axial registry; and
   said cam follower elements are receivable within respective ones of said internal bores, said bearing support means include bolt flange means that are connectable to said bosses by bolting.

25. A valve mechanism as recited in claim 15, wherein:
   said valve element is formed to define a flow port, said flow port being of greater cross-sectional dimension than the cross-sectional dimension of said inlet and outlet flow passages.

26. A valve mechanism as recited in claim 25, wherein:
   said flow port is of elongated configuration with the vertical dimension thereof being greater than the vertical dimension of said inlet and outlet flow passages.

27. A valve mechanism as recited in claim 15, wherein:
   internal frusto-conical sealing surface means is defined within said valve body; and
   external frusto-conical sealing surface means is defined by said actuator stem and is engageable with said internal frusto-conical sealing surface means to establish metal-to-metal sealing therewith.

28. A valve mechanism as recited in claim 27, wherein:
   said internal and external frusto-conical sealing surface means define stop means for limiting axial movement of said valve stem in one direction.

* * * * *